United States Patent
Goubard et al.

(10) Patent No.: US 9,493,692 B2
(45) Date of Patent: *Nov. 15, 2016

(54) SELF-ADHESIVE ARTICLE WITH FOAM SUPPORT

(71) Applicant: BOSTIK SA, La Plaine Saint Denis (FR)

(72) Inventors: David Goubard, Compiegne (FR); Olivier Laferte, Trosly Breuil (FR); Herveline Troadec, Compiegne (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,525

(22) Filed: Dec. 23, 2014

(65) Prior Publication Data

US 2015/0184045 A1    Jul. 2, 2015

(30) Foreign Application Priority Data

Dec. 30, 2013 (FR) ...................................... 13 63673

(51) Int. Cl.
| | | |
|---|---|---|
| *C09J 175/00* | (2006.01) | |
| *C09J 183/14* | (2006.01) | |
| *C09J 7/02* | (2006.01) | |
| *C09J 175/08* | (2006.01) | |
| *C08G 18/48* | (2006.01) | |
| *C08G 18/75* | (2006.01) | |
| *C08G 18/10* | (2006.01) | |
| *C08G 18/22* | (2006.01) | |
| *C08G 18/28* | (2006.01) | |

(52) U.S. Cl.
CPC .............. *C09J 183/14* (2013.01); *C08G 18/10* (2013.01); *C08G 18/227* (2013.01); *C08G 18/289* (2013.01); *C08G 18/4829* (2013.01); *C08G 18/755* (2013.01); *C09J 7/0246* (2013.01); *C09J 7/0289* (2013.01); *C09J 175/08* (2013.01); *C09J 2201/122* (2013.01); *C09J 2201/606* (2013.01); *C09J 2400/243* (2013.01); *C09J 2475/00* (2013.01); *C09J 2483/00* (2013.01); *Y10T 428/249983* (2015.04); *Y10T 428/2896* (2015.01)

(58) Field of Classification Search
CPC .. C08G 18/10; C08G 18/227; C08G 18/289; C08G 18/4829; C08G 18/755; C09J 183/01; C09J 7/0289; C09J 7/0246; C09J 2201/122; C09J 2201/606; C09J 2483/00; C09J 175/08; C09J 175/04; C09J 83/01
See application file for complete search history.

(56) References Cited

U.S. PATENT DOCUMENTS

| | | |
|---|---|---|
| 8,535,798 B2 | 9/2013 | Poivet et al. |
| 8,691,909 B2 | 4/2014 | Laferte et al. |
| 2003/0232950 A1* | 12/2003 | Roesler .............. C08G 18/0885 528/28 |
| 2011/0052912 A1 | 3/2011 | Poivet et al. |
| 2011/0151253 A1 | 6/2011 | Laferte et al. |

FOREIGN PATENT DOCUMENTS

| | | |
|---|---|---|
| EP | 0931800 A1 | 7/1999 |
| EP | 2336208 A1 | 6/2011 |
| WO | 2009106699 A2 | 9/2009 |
| WO | 2013136108 A1 | 9/2013 |

OTHER PUBLICATIONS

Pebax 2533 Data Sheet. 2013. http://www.pebax.com/export/sites/pebax/.content/medias/downloads/literature/tds-pebax-2533sa01.pdf.*
Search Report for FR-13/63.673 dated Sep. 5, 2014.

* cited by examiner

*Primary Examiner* — Michael L Leonard
(74) *Attorney, Agent, or Firm* — Millen, White, Zelano and Branigan, P.C.

(57) ABSTRACT

The present invention relates to a self-adhesive article comprising a support layer of foam or similar type and an adhesive layer obtained by cross-linking an adhesive composition. The present invention also relates to a mixture of at least two polymers suitable for use for the manufacture of the self-adhesive article as well as an adhesive composition comprising said mixture of at least two polymers according to the invention.

11 Claims, No Drawings

SELF-ADHESIVE ARTICLE WITH FOAM SUPPORT

TECHNICAL FIELD

The present invention relates to a self-adhesive article comprising a support layer of foam or similar type and an adhesive layer obtained by cross-linking an adhesive composition. The present invention also relates to a mixture of at least two polymers suitable for use for the manufacture of the self-adhesive article as well as an adhesive composition comprising said mixture of at least two polymers according to the invention.

STATE OF THE ART

Pressure-sensitive adhesives (also called self-adhesives or PSAs) are substances that give the support layer, also called a substrate, coated therewith an immediate tackiness or adhesivity (often called "tack") at room temperature, which allows its instantaneous adhesion to a substrate under the effect of brief slight pressure. PSAs are widely used for the manufacture of self-adhesive labels or films which are fastened to articles for the purpose of presenting information (such as a barcode, name, price) and/or for decorative purposes, whether temporarily or permanently affixed by adhesive. PSAs are also used for the manufacture of self-adhesive tapes for various uses. Mention may be made, for example, besides the transparent adhesive tape widely used in daily life, of: the forming and assembling of cardboard packaging; the protection of surfaces for painting works, fixing and holding various items such as panels, bricks, projecting objects, in the construction of buildings or structures; fixing and holding metal, plastic or glass parts, whether flat or having a specific profile, such as electrical cables, plastic films, window panes, sheets, inscriptions, logos, parts of seats, instrument panels, plastic or textile walls, pipes or tubes for conveying fluids, in particular in the transport industry, the bonding of carpets by double-sided adhesive tapes.

With a view to the manufacture of self-adhesive labels and/or tapes, PSAs are often applied by continuous coating processes to the entire surface of a (where appropriate printable) support layer of large dimensions, in a quantity (generally expressed in g/m2) denoted hereinbelow by the term "weight per unit area". The support layer is constituted by paper or film or sheet or plate of polymer material having one or more layers. The adhesive layer that covers the support layer may itself be covered with a protective non-stick layer (often called a "release liner"), for example composed of a siliconized film. The multilayer system obtained is generally packaged by being wound up in the form of large rolls that can reach up to 2 m in width and at least 1 m in diameter, which can be stored and transported.

These multilayer systems can subsequently be converted into self-adhesive labels that can be applied by the end user, by means of conversion processes which include printing the desired informative and/or decorative elements on the printable face of the support layer, then cutting them to the desired shape and dimensions. The release liner can easily be removed without modification of the adhesive layer which remains fixed on the support layer. After separation from its release liner, the label is applied to the article to which it is to be affixed, either manually or using labellers on automated packing lines.

These multilayer systems can also be converted into self-adhesive tapes by cutting and packing in rolls of determined width and length.

Owing to their high tack at ambient temperature, PSAs allow a rapid hold or attachment of the self-adhesive tape and/or label onto the substrate (or article) to which it is to be affixed (for example, in the case of labels, on bottles or, in the case of tapes, on cardboard boxes to be formed), suitable for reaching high industrial production speeds.

There is a field of application of PSAs for which it is desirable that the tack of the labels and/or tapes on the substrate is still maintained when the adhesive joint providing the attachment is exposed to a temperature that may vary over a wide range (as well as, therefore, the article to which the label and/or the tape is affixed). By way of example there may be mentioned the placing of labels on certain components of automobiles (or other vehicles) situated close to the engine, or on containers designed to receive a hot liquid during their packaging, or even on articles (such as tyres) which are hot-labelled when leaving the production lines. There may also be mentioned the use of self-adhesive tapes for assembling parts for which a good thermal resistance is necessary as in the case, for example, of the interior trim of aircraft or other vehicles.

It can also be useful to assemble surfaces which are not strictly parallel, or to bond a self-adhesive article onto a surface which is not smooth, for example a surface having irregularities. A support layer known as "conformable" makes it possible to gum the surface irregularities but also to bond two surfaces that are not strictly parallel to each other, for example by absorbing the differences in thickness, as the deformations originating from affixing the self-adhesive article or the use of the adhesive joint made in this way, the curved surfaces or complex surfaces require a joint that is as adhesive as possible, withstanding vibrations. When constituted, the joint can also act as a total, partial or temporary barrier to fluids that are more or less abundant and frequent.

Self-adhesive articles comprising this type of support known as "conformable" can be used in many fields of application, such as:
  automobile: for affixing logos, lettering, internal sound-proofing, interior trim, stickers in the passenger compartment;
  construction: for sound and thermal insulation, assembling windows;
  industry: for assembly (assembling-fixing), for fixing photopolymer sheets for example, used by printers;
  furniture: for fixing mirrors for example;
  electronics, for fixing or superimposition of the different constituent elements of the control or interface elements.

International application WO 2011/082094 describes a self-adhesive article comprising a support layer in the form of a foam and an adhesive composition based on polyacrylate modified by silylated functions. The polymers used in this document are solvent-phase polymers. This document does not describe the adhesive composition used for the manufacture of the self-adhesive article according to the invention.

U.S. Pat. No. 6,231,962 describes a self-adhesive article comprising a support layer in the form of a foam and an adhesive composition chosen from olefins, siliconized adhesives, adhesives based on natural rubber, adhesives based on synthetic rubber and other elastomer-based adhesives. The adhesive compositions described in this document have problems of high-temperature resistance and therefore do not have a satisfactory shear resistance. This document does not describe the adhesive composition used for the manufacture of the self-adhesive article according to the invention.

Application WO 2009/106699 describes a self-adhesive article comprising an adhesive layer obtained from a polyurethane. Application EP 2336208 describes a self-adhesive article comprising an adhesive layer obtained from a polyether. These two applications describe self-adhesive articles utilizing rigid supports of the polyethylene terephthalate (PET) type.

These two applications describe neither self-adhesive articles comprising a support as claimed, nor the particular mixture of at least two polymers as claimed.

The conformable supports are stretchable and generally have a low density. As a result, this type of support is deformable and can easily break. In particular, a foam has an alveolar structure, for example an air-filled structure with fine membranes, which consequently can easily break.

Not all the adhesive compositions which allow the manufacture of a self-adhesive article comprising a support of the PET type allow the manufacture of a self-adhesive article comprising a conformable support and having satisfactory properties for the applications in question, such as a high shear resistance and a high break temperature of the adhesive joint.

SUMMARY OF THE INVENTION

A first subject of the present invention relates to a self-adhesive article comprising a support layer coated with an adhesive layer, said support layer having an elongation at break ranging from 50 to 1200% and a bulk density ranging from 25 to 1200 kg/m³, said adhesive layer is obtained by cross-linking an adhesive composition comprising:

a) at least one polymer or a mixture of polymers having at least 20% of dialkoxylated silyl functions, with respect to the total quantity of silyl functions in the polymer or the mixture of polymers, and comprising at least 20% by weight, with respect to the total weight of the mixture of polymers, of at least one polyurethane or at least one polyether comprising two or three hydrolyzable terminal groups of dialkoxysilane type and corresponding to formula (II):

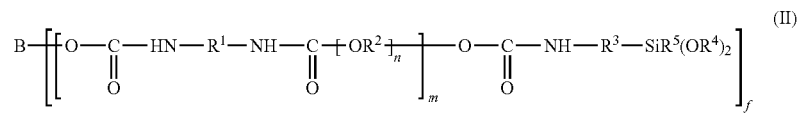

in formula (II) above,

B represents one of the two formulae below:

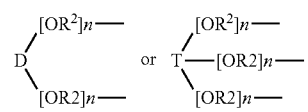

where D and T represent a hydrocarbon radical comprising 2 to 66 carbon atoms, linear, branched, cyclic, alicyclic or aromatic, saturated or unsaturated, optionally comprising one or more heteroatoms, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, $R^4$ and $R^5$, identical or different, each represent a linear or branched alkyl radical comprising 1 to 4 carbon atoms, $R^4$ optionally being able to be part of a ring, n is an integer such that the average molar mass of the polyether block of formula $—[OR^2]_n—$ ranges from 300 g/mol to 40000 g/mol, m is an integer such that the average molar mass of the polymer ranges from 600 g/mol to 100000 g/mol, f is an integer equal to 2 or 3.

b) at least one tackifier resin, and c) at least one cross-linking catalyst.

According to an embodiment, the adhesive composition also comprises:

from 0% up to 80% by weight with respect to the total weight of the mixture of polymers, of at least one polyurethane or at least one polyether, comprising two or three hydrolyzable terminal groups of trialkoxysilane type and corresponding to formula (I):

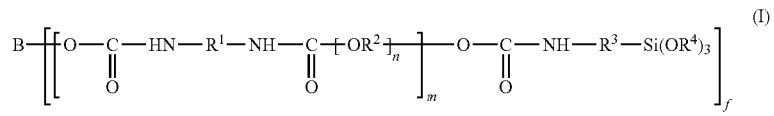

from 0% up to 15% by weight with respect to the total weight of the mixture of polymers, of at least one polyurethane or at least one polyether, comprising two or three hydrolyzable terminal groups of monoalkoxysilane type and corresponding to formula (III):

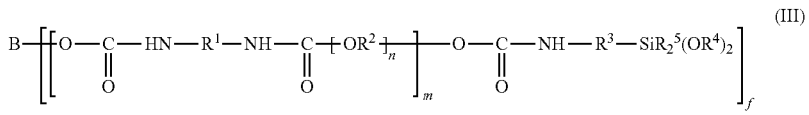
(III)

from 0% up to 15% by weight with respect to the total weight of the mixture of polymers, of at least one polyurethane or at least one polyether, comprising one hydrolyzable terminal group of mono-, di- and/or trialkoxysilane type and corresponding to formula (IV):

Preferably, the adhesive composition comprises:
from 20 to 85% by weight, with respect to the total weight of the adhesive composition, of at least one polymer or a mixture of polymers such as defined in the invention,

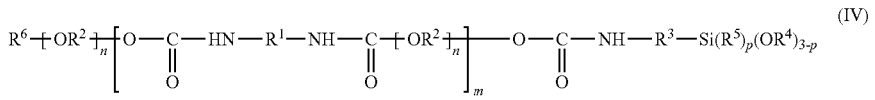
(IV)

in formulae (I), (III), and (IV) above:
B represents one of the two formulae below:

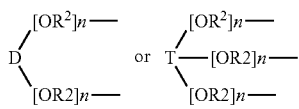

where D and T represent a hydrocarbon radical comprising 2 to 66 carbon atoms, linear, branched, cyclic, alicyclic or aromatic, saturated or unsaturated, optionally comprising one or more heteroatoms,
$R^1$ represents a divalent hydrocarbon radical comprising 5 to 15 carbon atoms which can be aromatic or aliphatic, linear, branched or cyclic,
$R^3$ represents a linear or branched divalent alkylene radical comprising 1 to 6 carbon atoms,
$R^2$ represents a linear or branched divalent alkylene radical comprising 2 to 4 carbon atoms,
$R^4$ and $R^5$, identical or different, each represent a linear or branched alkyl radical comprising 1 to 4 carbon atoms, $R^4$ optionally being able to be part of a ring,
$R^6$ represents a hydrocarbon radical comprising 1 to 22 carbon atoms, linear, branched, cyclic, alicyclic or aromatic, saturated or unsaturated, optionally comprising one or more heteroatoms,
n is an integer such that the average molar mass of the polyether block of formula $[OR^2]_n$— ranges from 300 g/mol to 40000 g/mol,
m is an integer such that the average molar mass of the polymer ranges from 600 g/mol to 100000 g/mol,
p is an integer equal to 0, 1 or 2.
f is an integer equal to 2 or 3.
Preferably, the support layer has a Young's modulus less than or equal to 300 MPa.
According to an embodiment, the support layer is in the form of a foam.

from 15 to 80% by weight, with respect to the total weight of the adhesive composition, of at least one tackifier resin,
from 0.01 to 3% by weight, with respect to the total weight of the adhesive composition, of at least one cross-linking catalyst.
According to an embodiment, the tackifier resin has a number-average molar mass ranging from 100 Da to 5 kDa, and is chosen from:
(i) resins able to be obtained by polymerization of terpene hydrocarbons and phenols, in the presence of Friedel-Crafts catalysts,
(ii) resins able to be obtained by polymerization of alpha-methyl styrene, (i) rosins of natural or modified origin;
(iv) resins obtained by hydrogenation, polymerization or copolymerization of mixtures of unsaturated aliphatic hydrocarbons having approximately 5, 9 or 10 carbon atoms, originating from petroleum cuts,
(v) terpene resins generally resulting from the polymerisation of terpene hydrocarbons in the presence of Friedel-Crafts catalysts,
(vi) copolymers based on natural terpenes, and
(vii) acrylic resins.
Another subject of the present invention relates to a mixture of at least two polymers suitable for use in the adhesive composition as defined in the invention, said mixture having at least 20% of dialkoxylated silyl functions with respect to the total quantity of silyl functions in the mixture of at least two polymers and comprising:
at least 20% by weight, with respect to the total weight of the mixture of polymers, of at least one polymer comprising two or three hydrolyzable terminal groups of dialkoxysilane type and corresponding to formula (II):

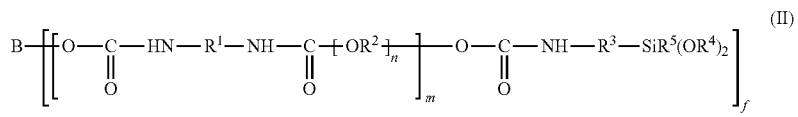
(II)

and
at least one polymer corresponding to one of formulae (I), (III) or (IV) wherein:
when a polymer of formula (I) is present, the mixture comprises up to 80% by weight, with respect to the total weight of the mixture, of at least one polyurethane or at least one polyether comprising two or three hydrolyzable terminal groups of trialkoxysilane type and corresponding to formula (I):

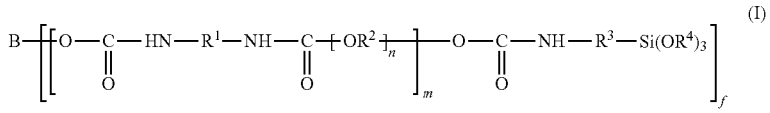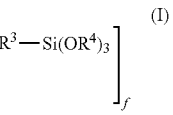

when a polymer of formula (III) is present, the mixture comprises up to 15% by weight, with respect to the total weight of the mixture, of at least one polyurethane or at least one polyether comprising two or three hydrolyzable terminal groups of monoalkoxysilane type and corresponding to formula (III):

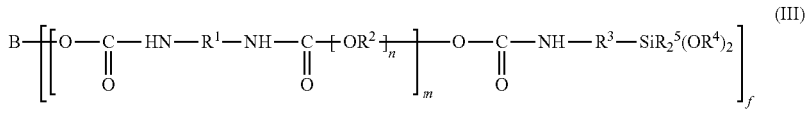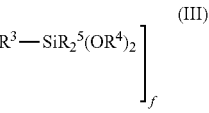

when a polymer of formula (IV) is present, the mixture comprises up to 15% by weight, with respect to the total weight of the mixture of polymers, of at least one polyurethane or at least one polyether comprising one hydrolyzable terminal group of the mono-, di- and-or trialkoxysilane type and corresponding to formula (IV):

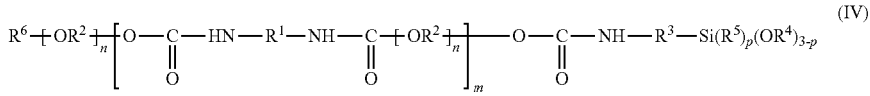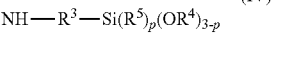

in formulae (I), (II), (III), and (IV) above:
B, $R^1$, $R^2$, $R^3$, $R^4$, $R^5$, $R^6$, n, p and f are selected independently of each other as defined in the invention.
According to an embodiment, the mixture according to the invention comprises:
up to 95% by weight, with respect to the total weight of the mixture, of at least one polymer corresponding to formula (I), and
at least one polymer corresponding to formula (II) as described in the present invention.
According to an embodiment, the mixture according to the invention comprises:
from 10 to 85% by weight of at least one polymer corresponding to formula (I), and
from 15 to 90% by weight of at least one polymer corresponding to formula (II),
with respect to the total weight of the mixture of at least two polymers.
According to an embodiment, the mixture according to the invention comprises:

up to 15% by weight, with respect to the total weight of the mixture, of at least one polymer corresponding to formula (III), and
at least one polymer corresponding to formula (II) as described in claim 1.
The invention also relates to an adhesive composition suitable for use for the manufacture of the self-adhesive article according to the invention, comprising:

the mixture of at least two polymers according to the invention,
at least one tackifier resin, and
at least one cross-linking catalyst.
Preferably, the adhesive composition according to the invention comprises:

from 20 to 85% by weight, with respect to the total weight of the adhesive composition, of said mixture of at least two polymers,
from 15 to 80% by weight, with respect to the total weight of the adhesive composition, of at least one tackifier resin,
from 0.01 to 3% by weight, with respect to the total weight of the adhesive composition, of at least one cross-linking catalyst.
The advantages of the present invention are the following:
the self-adhesive article according to the invention has excellent adhesive strength and tack properties;
the self-adhesive article according to the invention has a high shear resistance;
the self-adhesive article according to the invention is such that the adhesive joint resulting from its attachment on a substrate maintains the required cohesion over a large temperature range;
the self-adhesive article according to the invention can be applied to many surfaces, such as concrete, plastic or metal materials, automobile bodywork and painted materials;
the support layer present in the self-adhesive article according to the invention makes it possible to bond the self-adhesive article onto all types of surface, in particular surfaces with irregularities;

the self-adhesive article according to the invention makes it possible to gum the surface irregularities, despite the fact that the two surfaces to be bonded are not parallel;

the self-adhesive article according to the invention can be applied onto complex, curved surfaces;

the self-adhesive article according to the invention ensures a good thermal and sound insulation due to the properties of the support layer, in particular due to the support layer in the form of a foam.

DETAILED DESCRIPTION OF THE INVENTION

Self-adhesive Article

The present invention relates to a self-adhesive article comprising a support layer coated with an adhesive layer, said support layer having an elongation at break ranging from 50 to 1200% and a bulk density ranging from 25 to 1200 kg/m$^3$, said adhesive layer is obtained by cross-linking an adhesive composition comprising:

a) a polymer or a mixture of polymers having at least 20% of dialkoxylated silyl functions, with respect to the total quantity of silyl functions in the polymer or the mixture of polymers, and comprising at least one polyurethane or at least one polyether comprising two or three hydrolyzable terminal groups of dialkoxysilane type and corresponding to formula (II):

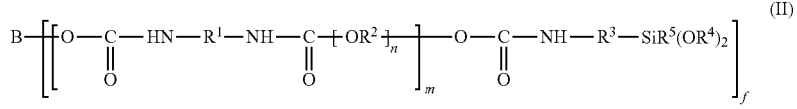

and optionally:

from 0% and up to 80% by weight with respect to the total weight of the mixture of polymers, of at least one polyurethane or at least one polyether, comprising two or three hydrolyzable terminal groups of trialkoxysilane type and corresponding to formula (I):

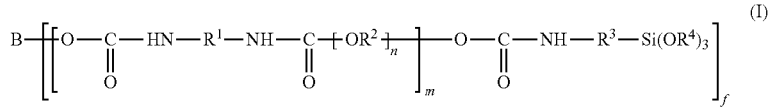

up to 15% by weight with respect to the total weight of the mixture of polymers, of at least one polyurethane or at least one polyether, comprising two or three hydrolyzable terminal groups of monoalkoxysilane type and corresponding to formula (III):

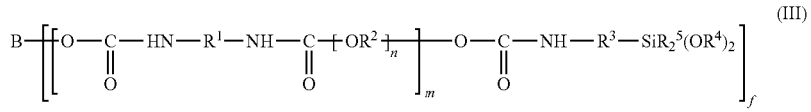

up to 15% by weight with respect to the total weight of the mixture of polymers, of at least one polyurethane or at least one polyether, comprising one hydrolyzable terminal group of mono-, di- and/or trialkoxysilane type and corresponding to formula (IV)

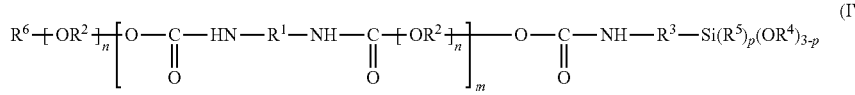

in formulae (I), (II), (III), and (IV) above:

B represents one of the two formulae below:

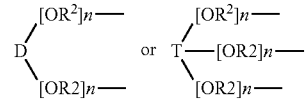

where D and T represent a hydrocarbon radical comprising 2 to 66 carbon atoms, linear, branched, cyclic, alicyclic or aromatic, saturated or unsaturated, optionally comprising one or more heteroatoms, such as oxygen, sulphur, nitrogen or halogen, $R^1$ represents a divalent hydrocarbon radical comprising 5 to 15 carbon atoms which can be aromatic or aliphatic, linear, branched or cyclic, $R^3$ represents a linear or branched divalent alkylene radical comprising 1 to 6 carbon atoms, $R^2$ represents a linear or branched divalent alkylene radical comprising 2 to 4 carbon atoms, preferably 3 carbon atoms, $R^4$ and $R^5$, identical or different, each represent a linear or branched alkyl radical comprising 1 to 4 carbon atoms, $R^4$ optionally being able to be part of a ring, $R^6$ represents a hydrocarbon-containing radical comprising 1 to 22 carbon atoms, linear, branched, cyclic, alicyclic or aromatic, saturated or unsaturated, optionally comprising one or more heteroatoms, such as oxygen, sulphur, nitrogen or halogen, n is an integer such that the average molar mass of the polyether block of formula —[OR$^2$]$_n$— ranges from 300 g/mol to 40000 g/mol, m is an integer such that the average molar mass of the polymer ranges from 600 g/mol to 100000 g/mol, p is an integer equal to 0, 1 or 2.

f is an integer equal to 2 or 3.

b) at least one tackifier resin, and c) at least one cross-linking catalyst.

In the case where the adhesive composition comprises at least two polymers of different formulae, each parameter defined above B, $R^1$, $R^2$, $R^3$, $R^4$, $R^5$, $R^6$, n, m, p and f can be chosen independently in each of the formulae, i.e. they are identical or different in each of the polymers.

By way of example, B can have the following structure (in this example f will be equal to 2):

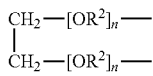

or the following structure (in this example f will then be equal to 3):

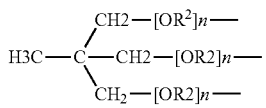

By way of example, $R^6$ can be a methyl radical.

Preferably, $R^1$ is chosen from one of the following divalent radicals, the formulae of which below reveal the 2 free valencies:

a) the divalent radical derived from isophorone:

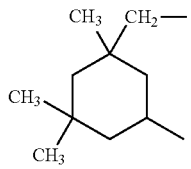

b)

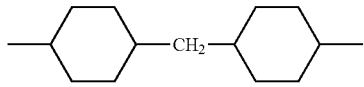

c)

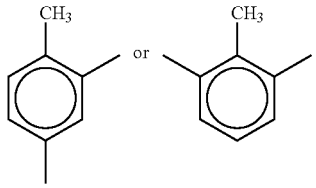

d)

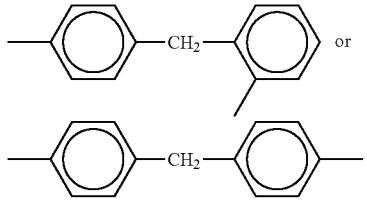

e)

—(CH$_2$)$_6$— (or hexamethylene radical).

Support Layer

The support layer has an elongation at break ranging from 50% to 1200%, preferably ranging from 100% to 1000%, even more preferably from 200% to 700%, and a bulk density ranging from 25 to 1200 kg/m$^3$, preferably ranging from 25 to 1000 kg/m$^3$, even more preferably from 25 to 900 kg/m$^3$, even more preferably from 32 to 800 kg/m$^3$, even more preferably from 50 to 600 kg/m$^3$, even more preferably from 60 to 400 kg/m$^3$.

The elongation at break can be measured according to standard ISO 1926 at 23° C., lengthwise or widthwise. Preferably, the elongation is measured lengthwise.

The bulk density can be measured according to standard ISO 845.

Fillers can be added during the manufacture of the support layer in order to obtain a support layer with a bulk density greater than or equal to 1000 kg/m$^3$. A person skilled in the art knows how to increase the bulk density of a material while maintaining the desired properties of elongation at break.

Preferably, the support layer has a Young's modulus lower than or equal to 300 MPa, preferably ranging from 2 to 100 MPa, even more preferably ranging from 5 to 50 MPa, more particularly ranging from 5 to 35 Mpa.

Preferably, the support layer has a thickness ranging from 0.01 to 50 mm, even more preferably ranging from 0.01 to 20.00 mm, preferably ranging from 0.05 to 10.00 mm, even more preferably ranging from 0.05 to 1.00 mm, advantageously ranging from 0.10 to 0.75 mm.

Preferably, the support layer is in the form of a foam.

Within the meaning of the present invention, a foam is a polymeric material comprising gas-filled cells. The foam can have open or closed cells, the structure of the foam depending on the process of expansion of the foam.

Preferably, the outer surface of the support layer in contact with the adhesive composition is closed, i.e. the cells present at the surface in contact with the adhesive composition are all closed cells.

Preferably, the whole of the support layer is a closed-cell foam.

According to a first embodiment, the support layer is made from a material chosen from:
  polyolefins, such as polyethylene, including high-density polyethylene, low-density polyethylene, linear low-density polyethylene and linear ultra-low density polyethylene, polypropylene and polybutylenes,
  polystyrene,
  natural or synthetic rubber,
  vinyl copolymers, such as plasticized or unplasticized polyvinyl chloride, and polyvinyl acetates,
  olefin copolymers, such as ethylene/methacrylate copolymers, ethylene/vinyl acetate copolymers, acrylonitrile/butadiene/styrene copolymers, and ethylene/propylene copolymers,
  polymers and acrylic copolymers,
  polyurethanes,
  polyethers,
  polyesters, and
  mixtures thereof.

Preferably, the support layer comprises a mixture of elastomer and/or plastic materials, such as polypropylene/polyethylene, polyurethane/polyolefins, polyurethane/polycarbonate, polyurethane/polyester.

Preferably, the support layer is in the form of one or more layers of polymer foam, preferably in the form of a polyolefin foam.

Among the foams which can be used for forming the support layer of the self-adhesive article according to the invention, there may be mentioned:
  TL SRZ® 1200.8 foam (available from Alveo) having an elongation at break of 408.8±53% at 23° C., a bulk density of approximately 96.62 kg/m$^3$, a thickness of approximately 0.67 mm and a Young's modulus of 11.2±0.5 MPa;
  TEE® 0400.2 foam (available from Alveo) having an elongation at break of 362.5±85% at 23° C., a bulk density of approximately 293 kg/m³, a thickness of approximately 0.17 mm and a Young's modulus of 18.3±0.6 MPa;

TMA SRZ® 0500.8 foam (available from Alveo) having an elongation at break of 717.5±117% at 23° C., a bulk density of approximately 196.31 kg/m³, a thickness of approximately 0.72 mm and a Young's modulus of 6.7±0.8 MPa; and TL SRZ® 0700.8 foam (available from Alveo) having an elongation at break of 635.4±76% at 23° C., a bulk density of approximately 148.15 kg/m³, a thickness of approximately 0.76 mm and a Young's modulus of 12.9±0.8 MPa.

According to an embodiment, the support layer is a syntactic foam. The technology of syntactic foams is described for example in the publication by Klempner et al., *Polymeric foam technology*, second edition, Hanser (2004), page 479.

The adhesive composition is applied onto the support for the manufacture of a self-adhesive article.

The support layer can be covered on one of its two faces, the back face which is not coated with the adhesive layer, by a release liner, for example by a siliconized film. In this way, the self-adhesive article can be rolled up on itself and then unrolled without any problems due to the lack of adhesion of the adhesive layer to the siliconized face.

The support layer according to the invention can also be treated with all types of surface treatment, such as a corona treatment making it possible in particular to increase the wettability.

Adhesive Composition

The adhesive layer is obtained by cross-linking the adhesive composition.

The adhesive composition used in the self-adhesive article of the invention comprises:
  a) a polymer or a mixture of polymers such as described below for the self-adhesive article, said polymer or said mixture of polymers having at least 20% of dialkoxylated silyl functions with respect to the total quantity of silyl functions in the polymer or the mixture of polymers,
  b) at least one tackifier resin,
  c) at least one cross-linking catalyst.

According to an embodiment, the adhesive composition used in the self-adhesive article of the invention consists essentially of:
  a) a polymer or a mixture of polymers such as described below for the self-adhesive article, said polymer or said mixture of polymers having at least 20% of dialkoxylated silyl functions with respect to the total quantity of silyl functions in the polymer or the mixture of polymers,
  b) at least one tackifier resin, and
  c) at least one cross-linking catalyst.

The percentage (D) of dialkoxylated silyl functions with respect to the total quantity of silyl functions in the polymer or the mixture of polymers is calculated in the following manner.

For the purposes of the present calculation, the polymer or the mixture of polymers is considered to comprise:
  t polymers comprising at least one dialkoxylated silyl function, t being an integer that may vary from 1 to 10, preferably t ranges from 1 to 5, even more preferably t ranges from 1 to 2; and
  s silylated polymers having no dialkoxylated silyl functions, s being an integer that may vary from 0 to 10, preferably s ranges from 1 to 5, even more preferably s ranges from 1 to 2.

Let D be the percentage of dialkoxylated silyl functions with respect to the total quantity of silyl functions in the polymer or the mixture of polymers, Let E(s) be the quantity of silyl functions in the polymer s, expressed in milliequivalent per gram of polymer s as defined above, Let E(t) be the quantity of dialkoxylated silyl functions in the polymer t, expressed in milliequivalent per gram of polymer t as defined above, Let G(s) be the quantity of polymer s in relation to the total quantity of silylated polymers s and t, expressed as a percentage by mass of polymer s with respect to the total quantity of polymers s and t, Let G(t) be the quantity of polymer t in relation to the total quantity of silylated polymers s and t, expressed as a percentage by mass of polymer t with respect to the total quantity of polymers s and t, Let A(t) have the following relationship:

$$A(t) = \frac{E(t) \times G(t)}{100}$$

Let A(s) have the following relationship:

$$A(s) = \frac{E(s) \times G(s)}{100}$$

Let B be the sum corresponding to the sum of each A(t) and of each A(s):

$$B = \Sigma A(t) + \Sigma A(s)$$

D is calculated in the following manner:

$$D = \frac{\sum A(t)}{B} \times 100$$

The values of E(s) and E(t) for the polymers respectively of type s and t are given by the suppliers or can be determined by NMR analysis or, these values can be determined as a function of the content (% by mass) and the nature (chemical structure and molar mass) of the isocyanatosilanes used for the synthesis of the polymers (I), (II), (III) and (IV).

When the adhesive composition comprises a single silyl polymer corresponding to formula (II), i.e. a single polymer t, then A(s) is equal to zero and D is equal to 100%.

When the adhesive composition comprises a mixture of polymers of which at least one polymer of formula (II) (i.e. a polymer t) and at least one other silyl polymer having monoalkoxy or trialkoxy functions (i.e. s different from zero) then the percentage of dialkoxylated silyl functions with respect to the total quantity of silyl functions in the polymer or the mixture of polymers is less than 100%.

Preferably, the percentage of dialkoxylated silyl functions is greater than or equal to 25%, even more preferably greater than or equal to 30%, even more preferably greater than or equal to 40%, with respect to the total quantity of silyl functions in the polymer or the mixture of polymers.

The polymer or the mixture of polymers used in the self-adhesive article according to the invention comprises at least 20% by weight with respect to the total weight of the mixture of polymers of at least one polyurethane or at least one polyether corresponding to formula (II).

Preferably, the polymer or the mixture of polymers used in the self-adhesive article according to the invention comprises from 25 to 100%, preferably from 30 to 95%, even more preferably from 40 to 80%, by weight with respect to the total weight of the mixture of polymers, of at least one polyurethane or at least one polyether corresponding to formula (II).

According to an embodiment, the mixture of polymers also comprises:
- up to 80% by weight, preferably from 10 to 75% by weight, even more preferably from 20 to 60% by weight, with respect to the total weight of the mixture of polymers, of at least one polyurethane or at least one polyether corresponding to formula (I), and/or
- up to 15% by weight, preferably from 1 to 15% by weight, even more preferably from 5 to 13% by weight, with respect to the total weight of the mixture of polymers, of at least one polyurethane or at least one polyether corresponding to formula (III), and/or
- up to 15% by weight, preferably from 1 to 15% by weight, even more preferably from 5 to 13% by weight, with respect to the total weight of the mixture of polymers, of at least one polyurethane or at least one polyether corresponding to formula (IV).

The polymers corresponding to one of formulae (I), (II), (III) and (IV) can be obtained according to a process described in applications EP 2 336 208 and WO 2009/106699 with optionally a total substitution or a partial substitution of the polyether diols by polyether monols in the polymers of formula (IV).

Preferably, the number-average molar mass of the polymer of formula (II) used for the manufacture of the self-adhesive article according to the invention ranges from 600 to 100000 g/mol, even more preferably from 1000 to 50000 g/mol, even more preferably from 5000 to 20000 g/mol.

Within the context of the present invention, the number-average molar mass (Mn) expressed in g/mol is calculated from the quantity of silyl functions E(s) or E(t) expressed in meq/g and the functionality F of the polymer.

The functionality F is equal to 2 or 3 for the polymers of formula (I), (II) and (III).

The functionality F is equal to 1 for the polymers of formula (IV).

The number-average molar mass is calculated as follows respectively for the polymers of type s and the polymers of type t:

$$Mn = \frac{F \times 1000}{E(s)}$$

$$Mn = \frac{F \times 1000}{E(t)}$$

Preferably, the polymer or the mixture of polymers used for the manufacture of the self-adhesive article according to the invention has a number-average molar mass ranging from 600 to 100000 g/mol, even more preferably from 1000 to 50000 g/mol, even more preferably from 5000 to 20000 g/mol.

Among the polymers corresponding to formula (II), there may be mentioned:
GENIOSIL® STP-10 (available from Wacker): polyether with two terminal groups of dimethoxysilane type, an average molar mass of 8889 g/mol, a polydispersity of approximately 1.6 and a quantity of silyl functions E(t) of 0.225 milliequivalent per gram of polymer;
GENIOSIL® STP-30 (available from Wacker): polyether with two terminal groups of dimethoxysilane type, an average molar mass of 14493 g/mol, a polydispersity of approximately 1.6 and a quantity of silyl functions E(t) of 0.138 milliequivalent per gram of polymer.

Among the polymers corresponding to formula (I), there may be mentioned:
GENIOSIL® STP-15 (available from Wacker): polyether with two terminal groups of trimethoxysilane type, an average molar mass of 10000 g/mol, a polydispersity of approximately 1.6 and a quantity of silyl function E(s) of 0.200 milliequivalent per gram of polymer;
SPUR+® 1050MM (available from Momentive): polyurethane with two terminal groups of trimethoxysilane type, an average molar mass of 16393 g/mol, a polydispersity of approximately 1.7 and a quantity of silyl functions of 0.122 milliequivalent per gram of polymer;
DESMOSEAL® S XP 2636 (available from Bayer): having two terminal groups of trimethoxysilane type, an average molar mass of 15038 g/mol and a quantity of silyl functions E(s) of 0.133 milliequivalent per gram of polymer.

According to an embodiment, the mixture of polymers that can be used for the manufacture of the self-adhesive article according to the invention also comprises one or more other silylated polymers.

By "other silylated polymer", is meant a polymer different from the polymers corresponding to formulae (I), (II), (III) and (IV) defined above and comprising at least one terminal group of the mono-, di- or tri-alkoxysilane type corresponding to the general formula: —Si$(R^5)_p(OR^4)_{3-p}$ where $R^5$, $R^4$ and p have the same meaning as above.

According to an embodiment, the other silylated polymer or polymers are chosen from polyurethanes and polyethers having one, two or three terminal groups of mono-, di- or tri-alkoxysilane type corresponding to general formula: —Si$(R^5)_p(OR^4)_{3-p}$ where $R^5$, R4 and p have the same meaning as above.

According to an embodiment, the tackifier resin has a number-average molar mass ranging from 100 Da to 5 kDa, preferably 500 Da to 4 kDa.

According to an embodiment, the tackifier resin is chosen from:
(i) the resins able to be obtained by polymerization of terpene hydrocarbons and phenols, in the presence of Friedel-Crafts catalysts,
(ii) the resins able to be obtained by polymerization of alpha-methyl styrene, and optionally by reaction with phenols.
(iii) rosins of natural or modified origin, such as rosin extracted from pine gum, wood rosin extracted from tree roots and their derivatives, hydrogenated, dimerized, polymerized or esterified by monoalcohols or polyols such as glycerol;
(iv) resins obtained by hydrogenation, polymerization or copolymerization (with an aromatic hydrocarbon) of mixtures of unsaturated aliphatic hydrocarbons having approximately 5, 9 or 10 carbon atoms, originating from petroleum cuts;

(v) terpene resins resulting generally from the polymerization of terpene hydrocarbons such as mono-terpene (or pinene) in the presence of Friedel-Crafts catalysts,
(vi) copolymers based on natural terpenes, for example styrene-terpene, alpha-methyl styrene-terpene and vinyl toluene-terpene, and
(vii) acrylic resins.

Such resins are commercially available and from those of type (i), (ii) and (iii) defined above, the following products may be mentioned:
resins of type (i): Dertophene® 1510 available from the company DRT having a number-average molar mass Mn of approximately 870 Da; Dertophene® H150 available from the same company, of number-average molar mass Mn equal to approximately 630 Da; Sylvarez® TP 95 available from the company Arizona Chemical having a number-average molar mass Mn of approximately 1200 Da;
resins of type (ii): Norsolene® W100 available from the company Cray Valley, which is obtained by polymerization of alpha-methyl styrene without the action of phenols, with a number-average molar mass of 900 Da; Sylvarez® 510 which is also available from the company Arizona Chemical with a number-average molar mass Mn of approximately 1740 Da, the process of obtaining which also comprises the addition of phenols.
resins of type (iii): Sylvalite® RE 100 which is an ester of rosin and pentaerythritol available from the company Arizona Chemical and having a number-average molar mass Mn of approximately 1700 Da.

The number-average molar masses of the resins can be measured using methods well known to a person skilled in the art, for example by steric exclusion chromatography using a polyethylene glycol standard.

According to a preferred variant, a resin chosen from those of type (i) or (ii) is used as a tackifier resin.

According to another preferred variant, a resin of type (iii) and preferably a rosin ester is used as a tackifier resin.

The cross-linking catalyst used in the adhesive composition according to the invention can be any catalyst known to a person skilled in the art for the condensation of silanol. Mention may be made as examples of such catalysts, of organic derivatives of titanium such as titanium acetyl acetonate (commercially available under the name TYZOR® AA75 from the company DuPont), aluminium such as aluminium chelate (commercially available under the name K-KAT® 5218 from the company King Industries), amines such as 1,8-diazobicyclo(5.4.0) undecene-7 or DBU.

Preferably, the adhesive composition comprises less than 5% by weight of solvents, preferably less than 3% by weight, even more preferably less than 1% by weight, ideally less than 0.5% by weight, with respect to the total weight of the adhesive composition before cross-linking of the silylated functions.

Optionally, the composition according to the invention can also include, in combination with the polymer or the mixture of polymers described above, thermoplastic polymers often used in the preparation of the HMPSAs, such as Ethylene Vinyl Acetate (EVA) or styrene block copolymers.

The adhesive composition can moreover comprise up to 3% by weight of a hydrolyzable alkoxysilane derivative, as a desiccant, preferably a trimethoxysilane derivative. Such an agent advantageously extends the shelf-life of the composition according to the invention during storage and transport, before its use. There may be mentioned for example gamma-methacryloxypropyltrimethoxysilane available under the trade name of SILQUEST® A-174 from the company US Momentive Performance Materials Inc.

The composition according to the invention can also include a plasticizer such as a phthalate or a benzoate, a paraffinic and naphthenic oil (such as the Primol® 352 from the company ESSO) or also a wax of a homopolymer of polyethylene (such as A-C® 617 from Honeywell), or a polyethylene and vinyl acetate copolymer wax, or also pigments, colorants or fillers.

Finally, a quantity from 0.1 to 2% by weight of one or more stabilizers (or antioxidants) is preferably included in the composition according to the invention. These compounds are introduced in order to protect the composition from degradation resulting from a reaction with oxygen which is likely to be caused by the action of heat or light. These compounds can include primary antioxidants which trap the free radicals and which are in particular substituted phenols such as Irganox® 1076 from CIBA. The primary antioxidants can be used alone or in combination with other secondary anti-oxidants or UV stabilizers.

According to an embodiment, the adhesive composition comprises:
a) from 20 to 85%, preferably from 40 to 65%, by weight of the polymer or of the mixture of polymers as described above,
b) from 15% to 80%, preferably from 25 to 70%, preferably from 35 to 60%, by weight of tackifier resin(s), and
c) from 0.01 to 3% by weight of cross-linking catalyst(s). with respect to the total weight of the adhesive composition.

According to an embodiment, the adhesive composition consists essentially of:
a) from 20 to 85%, preferably from 40 to 65%, by weight of the polymer or of the mixture of polymers as described above,
b) from 15% to 80%, preferably from 25 to 70%, preferably from 35 to 60%, by weight of tackifier resin(s), and
c) from 0.01 to 3% by weight of cross-linking catalyst(s), with respect to the total weight of the adhesive composition.

The hot cross-linkable adhesive composition used in the manufacture of the self-adhesive article according to the invention can be prepared by a process which comprises:
a step of mixing in the absence of air, preferably under an inert atmosphere, of the polymer or mixture of polymers with the tackifier resin(s), at a temperature comprised between 30 and 170° C., preferably between 100 and 170° C., then a step of cooling said mixture to a temperature ranging from 30 to 90° C., and advantageously approximately 70° C., then
a step of incorporating the cross-linking catalyst into said mixture obtained in the previous step and, if applicable, the desiccant and other optional constituents.

According to an embodiment of the invention, the adhesive layer, after at least partial cross-linking of the silylated functions, has a loop tack of at least 0.75 N/cm, preferably at least 0.80 N/cm, even more preferably at least 0.90 N/cm, ideally at least 1 N/cm, preferably without residues, value measured on a glass plate.

According to an embodiment of the invention, the adhesive layer as described above, can have a loop tack of at least 5 N/cm, preferably at least 6 N/cm, even more preferably at least 7 N/cm, ideally at least 8 N/cm. According to an embodiment, the adhesive composition according to the invention can have a loop tack ranging from 0.75 to 8 N/cm, preferably from 0.80 to 7 N/cm, even more preferably from 0.90 to 6 N/cm, ideally 1 to 5 N/cm. Said loop tack can be obtained immediately after bonding the article onto a surface and/or a few hours after bonding the article onto a surface and/or a few days after bonding the article onto a surface.

Within the meaning of the present invention, the term "self-adhesive article" includes any article which can be bonded onto a surface by the effect of manual or mechanical pressure alone, without the use of additional glues or adhesives. The expression "self-adhesive article" also comprises the expression "Pressure Sensitive Adhesive" article or "PSA" article. The purpose of these articles is to be applied on a surface to be bonded in order to bring closer together, hold, fix, or simply to immobilize, to display shapes, logos, images or information. These articles can be used in many fields, such as the medical field, clothing, packaging, automobile or construction, thanks in particular to excellent thermal and sound insulation properties. They can be formed according to their end use, for example in the form of tapes, such as tapes for industrial use, tapes for DIY use or for fixing on construction sites, single- or double-sided tapes, or in the form of labels, bandages, dressings, patches or graphic films.

The self-adhesive article according to the invention can be applied onto surfaces with irregularities, onto curved or complex surfaces or also onto surfaces that may be deformed or that have deformations. The article according to the invention can make it possible to bond two surfaces that are not strictly flat. In particular, the surface to be bonded can have properties comparable to the properties of the support layer.

The surface to be bonded can be chosen from plastics, concrete, steel, glass, cardboard, skin, textiles, foam. The surface may or may not be painted.

According to an embodiment of the invention, the self-adhesive article also comprises a protective non-stick release liner ("release liner").

According to an embodiment, said release liner is applied onto the adhesive layer, after cross-linking the adhesive composition.

According to a first embodiment, the self-adhesive article according to the invention can be prepared by a process comprising the following steps:
 (a) conditioning the adhesive composition as defined previously at a temperature ranging from 20 to 160° C.; then
 (b) coating the adhesive composition obtained in step (a) onto a bearing surface; then
 (c) cross-linking the coated adhesive composition, by heating the coated bearing surface at a temperature ranging from 20 to 200° C.;
 optionally
 (d) laminating or transfer of the cross-linked adhesive layer onto a support layer or onto a release liner.

By "bearing surface" within the meaning of the present invention is meant either a conveyor belt covered with a non-stick layer, or a release liner, or a support layer.

In the case where the bearing surface is not a support layer, the process of obtaining the self-adhesive article according to the invention comprises step (d) of transferring the cross-linked adhesive layer onto a support layer.

In the case where the bearing surface is a support layer, the process of obtaining the self-adhesive article according to the invention may comprise step (d) of laminating the cross-linked adhesive layer onto a release liner.

According to an embodiment, the process of manufacturing the self-adhesive article according to the invention also comprises a step (e) of coating a second layer of adhesive composition onto the support layer followed by a step (f) of cross-linking the adhesive composition coated in step (e) by heating at a temperature ranging from 20 to 200° C. According to this embodiment, a double-sided self-adhesive article is obtained.

The coating step (b) can be carried out by means of known coating devices, such as for example a lip- or curtain-type nozzle, or also with a roller. It uses a weight per unit area of adhesive composition ranging from 3 to 2000 $g/m^2$, preferably from 5 to 500 $g/m^2$, even more preferably from 10 to 250 $g/m^2$.

Preferably, the coating is continuous or practically continuous.

According to an embodiment, during step (c) the coated adhesive composition moreover undergoes a treatment in a moist atmosphere characterized by its moisture level. Preferably, the moist atmosphere is a atmosphere in which from 2 to 100% of the molecules are water molecules, preferably from 4 to 50%, even more preferably from 5 to 10% of the molecules are water molecules.

The moisture level is expressed as a percentage of water per unit of volume, which corresponds to the number of molecules of water divided by the total number of molecules in a unit of volume. Due to the linear nature of this scale, the moisture level is easily measured and controlled by using for example P.I.D (Proportional-Integral-Derivative) type monitors. The percentage by weight can be calculated by multiplying the percentage of the number of molecules of water with respect to the total number of molecules by a factor of 0.622. General information on the moisture level in various environments is described by W. Wagner et al., in "*International Steam Tables—Properties of Water and Steam based on the Industrial Formula IAPWS-IF97*".

The time necessary for the cross-linking step (c) can vary within wide limits, for example between 1 second and 10 minutes, depending on the weight per unit area of adhesive composition deposited on the bearing surface, the heating temperature, and the moisture.

This step of thermal cross-linking results in the creation—between the polymer chains of the polymer or of the mixture of polymers as described above and under the action of moisture—of siloxane-type bonds which lead to the formation of a three-dimensional polymer network. The adhesive composition that is cross-linked in this way is a pressure-sensitive adhesive which confers the desired adhesive power and tack on the support coated therewith.

Preferably, the coating is carried out uniformly on the support layer or on the release liner but the coating can also be adapted to the desired shape of the final self-adhesive article.

According to an embodiment, the coating by the adhesive composition is performed on at least a part of both faces of the support layer. If both faces of the support layer are coated, the adhesive composition can be identical or different on the two faces, and the weight per unit area can be identical or different on the two faces.

According to an embodiment of the invention, the self-adhesive article comprises an adhesive layer over at least a part of one face or both faces of the support layer, said adhesive layer(s) being optionally coated with a release liner. According to an embodiment, the self-adhesive article comprises two release liners on each of the two adhesive layers. In this case, the two protective layers can be made from identical or different materials and/or they can have an identical or different thickness.

The self-adhesive article according to the invention can be used in a bonding method comprising the following steps:
a) removing the release liner, when such a film is present;
b) applying the article onto a surface; and
c) applying pressure on said article.

According to an embodiment in which the self-adhesive article is a double-sided article, the bonding method also comprises a step in which either a second surface is applied onto the article bonded onto the first surface or the article bonded onto the first surface is applied onto a second surface.

Mixture of at Least Two Polymers

The present invention also relates to a mixture of at least two polymers, able to be incorporated into the adhesive composition used for the manufacture of the self-adhesive article according to the invention. The mixture of at least two polymers according to the invention has at least 20% of dialkoxylated silyl functions with respect to the total quantity of silyl functions in the mixture of at least two polymers and comprises:
   up to 20% by weight, with respect to the total weight of the mixture of at least two polymers, of a polymer corresponding to formula (II) and
   at least one polymer corresponding to one of formulae (I), (III), (IV) as described above.

The percentage of dialkoxylated silyl functions with respect to the total quantity of silyl functions in the mixture of at least two polymers is defined in the same manner as previously for the self-adhesive article. Preferably, the percentage of dialkoxylated silyl functions is greater than or equal to 25%, even more preferably greater than or equal to 30%, even more preferably greater than or equal to 40%, with respect to the total quantity of silyl functions in the mixture of at least two polymers.

Preferably, the mixture of polymers according to the invention has an average molar mass ranging from 600 to 100000 g/mol, even more preferably 1000 to 50000 g/mol, even more preferably 5000 to 20000 g/mol.

When a polymer belonging to formula (I) is present in the mixture of at least two polymers according to the invention, said mixture comprises up to 80% by weight, with respect to the total weight of said mixture, of one or more polymers of formula (I).

When a polymer belonging to formula (III) is present in the mixture of at least two polymers according to the invention, said mixture comprises up to 15% by weight, with respect to the total weight of said mixture, of one or more polymers of formula (III).

When a polymer corresponding to formula (IV) is present in the mixture of at least two polymers according to the invention, said mixture comprises up to 15% by weight, with respect to the total weight of said mixture, of one or more polymers of formula (IV).

According to an embodiment of the invention, the mixture of at least two polymers comprises:
   up to 80% by weight, with respect to the total weight of the mixture of polymers, of at least one polymer corresponding to formula (I), and
   at least 20% by weight, with respect to the total weight of the mixture of polymers, of at least one polymer corresponding to formula (II).

Preferably, the mixture of at least two polymers comprises:
   from 10 to 80% by weight, preferably from 20 to 75% by weight, even more preferably from 25 to 65% by weight, advantageously from 30 to 60% by weight, of at least one polymer corresponding to formula (I), and
   from 20 to 90% by weight, preferably from 25 to 80% by weight, even more preferably from 35 to 75% by weight, advantageously from 40 to 70% by weight, of at least one polymer corresponding to formula (II),
with respect to the total weight of the mixture of at least two polymers.

According to an embodiment of the invention, the mixture of at least two polymers consists essentially of:
   up to 80% by weight, with respect to the total weight of the mixture of polymers, of at least one polymer corresponding to formula (I), and
   at least 20% by weight, with respect to the total weight of the mixture of polymers, of at least one polymer corresponding to formula (II).

Preferably, the mixture of at least two polymers consists essentially of:
   from 10 to 80% by weight, preferably from 20 to 75% by weight, even more preferably from 25 to 65% by weight, advantageously from 30 to 60% by weight, of at least one polymer corresponding to formula (I), and
   from 20 to 90% by weight, preferably from 25 to 80% by weight, even more preferably from 35 to 75% by weight, advantageously from 40 to 70% by weight, of at least one polymer corresponding to formula (II),
with respect to the total weight of the mixture of at least two polymers.

According to an embodiment of the invention, the mixture of at least two polymers comprises:
   at least 20% by weight, with respect to the total weight of the mixture of at least two polymers, of a polymer corresponding to formula (II), and
   up to 15% by weight, with respect to the total weight of the mixture of polymers, of at least one polymer corresponding to formula (III).

Preferably, the mixture of at least two polymers comprises:
   from 85 to 99% by weight, preferably from 87 to 97% by weight, even more preferably from 90% to 95% by weight, of at least one polymer corresponding to formula (II), and
   from 1 to 15% by weight, preferably from 3 to 13% by weight, even more preferably from 5 to 10% by weight, of at least one polymer corresponding to formula (III),
with respect to the total weight of the mixture of at least two polymers.

According to an embodiment of the invention, the mixture of at least two polymers consists essentially of:
   at least 20% by weight, with respect to the total weight of the mixture of polymers, of a polymer corresponding to formula (II), and
   up to 15% by weight, with respect to the total weight of the mixture of polymers, of at least one polymer corresponding to formula (III).

Preferably, the mixture of at least two polymers consists essentially of:
   from 85 to 99% by weight, preferably from 87 to 97% by weight, even more preferably from 90% to 95% by weight, of at least one polymer corresponding to formula (II), and
   from 1 to 15% by weight, preferably from 3 to 13% by weight, even more preferably from 5 to 10% by weight, of at least one polymer corresponding to formula (III),
with respect to the total weight of the mixture of at least two polymers.

According to an embodiment of the invention, the mixture of at least two polymers comprises:
at least 20% by weight, with respect to the total weight of the mixture of at least two polymers, of a polymer corresponding to formula (II), and
up to 15% by weight, with respect to the total weight of the mixture of polymers, of at least one polymer corresponding to formula (IV).

Preferably, the mixture of at least two polymers comprises:
from 85 to 99% by weight, preferably from 87 to 97% by weight, even more preferably from 90% to 95% by weight, of at least one polymer corresponding to formula (II), and
from 1 to 15% by weight, preferably from 3 to 13% by weight, even more preferably from 5 to 10% by weight, of at least one polymer corresponding to formula (IV),
with respect to the total weight of the mixture of at least two polymers.

According to an embodiment of the invention, the mixture of at least two polymers consists essentially of:
at least 20% by weight, with respect to the total weight of the mixture of at least two polymers, of a polymer corresponding to formula (II), and
up to 15% by weight, with respect to the total weight of the mixture of polymers, of at least one polymer corresponding to formula (IV).

Preferably, the mixture of at least two polymers consists essentially of:
from 85 to 99% by weight, preferably from 87 to 97% by weight, even more preferably from 90% to 95% by weight, of at least one polymer corresponding to formula (II), and
from 1 to 15% by weight, preferably from 3 to 13% by weight, even more preferably from 5 to 10% by weight, of at least one polymer corresponding to formula (IV),
with respect to the total weight of the mixture of at least two polymers.

According to an embodiment, the mixture of at least two polymers comprises essentially polymers of formulae (I), (II), (III) and (IV). Preferably, the mixture of at least two polymers according to the invention does not include polymers other that those corresponding to formulae (I), (II), (III) and (IV).

According to another embodiment, the mixture of at least two polymers also comprises one or more other silylated polymers.

By "other silylated polymer", is meant a polymer different from the polymers of formulae (I), (II), (III) and (IV) defined above and comprising at least one silylated function corresponding to general formula: $Si(R^5)_p(OR^4)_{3-p}$ where $R^5$, $R^4$ and p have the same meaning as above.

According to an embodiment, the other silylated polymer or polymers are chosen from polyurethanes and polyethers having one, two or three terminal groups of mono-, di- or tri-alkoxysilane type corresponding to general formula: $-Si(R^5)_p(OR^4)_{3-p}$ where $R^5$, $R^4$ and p have the same meaning as above.

Preferably, the mixture of at least two polymers according to the invention consists essentially of polymers of formulae (I), (II), (III), (IV) and the other silylated polymers as defined in the present invention.

Adhesive Composition

The present invention also relates to an adhesive composition suitable for use for the manufacture of the self-adhesive article according to the invention.

The composition according to the invention comprises:
a) the mixture of at least two polymers according to the invention,
b) at least one tackifier resin, and
c) at least one cross-linking catalyst.

According to an embodiment, the adhesive composition according to the invention comprises:
a) from 20 to 85% by weight, preferably from 40 to 65% by weight, of the mixture of at least two polymers according to the invention,
b) from 15 to 80% by weight, preferably from 25 to 70% by weight, even more preferably from 35 to 60% by weight, of tackifier resin(s),
c) from 0.01 to 3% by weight of cross-linking catalyst(s).
with respect to the total weight of the adhesive composition.

According to an embodiment, the adhesive composition according to the invention consists essentially of:
a) from 20 to 85% by weight, preferably from 40 to 65% by weight, of the mixture of at least two polymers according to the invention,
b) from 15 to 80% by weight, preferably from 25 to 70% by weight, even more preferably from 35 to 60% by weight, of tackifier resin(s),
c) from 0.01 to 3% by weight of cross-linking catalyst(s).
with respect to the total weight of the adhesive composition.

Preferably, the tackifier resin is as described previously for the self-adhesive article according to the invention.

Preferably, the cross-linking catalyst is as described previously for the self-adhesive article according to the invention.

According to an embodiment, the adhesive composition according to the invention also comprises one or more additives chosen from desiccants, plasticizers, stabilizers (or antioxidants). Preferably, these additives are as described previously for the self-adhesive article according to the invention.

The adhesive composition according to the invention can be prepared by a process comprising:
a step of mixing in the absence of air, preferably under an inert atmosphere, of the mixture of at least two polymers with the tackifier resin(s), at a temperature comprised between 30 and 170° C., preferably between 100 and 170° C., then a step of cooling said mixture to a temperature ranging from 30 to 90° C., and advantageously approximately 70° C., then
a step of incorporating the cross-linking catalyst into said mixture obtained in the previous step and, if applicable, the desiccant and other optional constituents.

The adhesive composition according to the invention is not described in the prior art. The adhesive composition according to the invention can be used with a support different from the support layer described above for the self-adhesive article according to the invention.

The adhesive composition according to the invention can be used for the manufacture of a self-adhesive article, comprising a temporary or permanent support and an adhesive layer, said adhesive layer being obtained by cross-linking the adhesive composition.

The support of the self-adhesive article obtained from the adhesive composition according to the invention can be a temporary or permanent support.

In the case where the support is a temporary support, the support is preferably a non-stick protective film ("release liner"). In this case, once the article is bonded onto a surface, the bonded article comprises only an adhesive layer, the temporary supports being intended to be removed.

In the case where the support is a permanent support, the support can be based on any materials that can be used for the manufacture of pressure-sensitive or PSA articles, such as polypropylene, polyethylene, polyimide and paper. The support can be made from fibre or plastic tapes, fabric, metal fibre or glass fibre.

According to an embodiment, the support is based on polyethylene terephthalate (PET), polypropylene (PP) or polyurethane (PU).

According to an embodiment of the invention, the support is in the form of a grid or mesh or a non-woven material. In this case, the adhesive layer can be present on a single face of the support, but can also penetrate within the support during the application of the adhesive composition thanks to the porous nature of the support, so that the fibres of the support are completely coated with the adhesive composition. In this case, a release liner is preferably present on the adhesive layer or adhesive composition.

According to an embodiment, the self-adhesive article obtained from the adhesive composition according to the invention comprises a permanent support coated with an adhesive layer. Preferably, the adhesive layer is moreover coated with a release liner, preferably a siliconized film.

By way of alternative to the release liner, the back face of the permanent support which is not coated with the adhesive layer, can have a non-stick surface, for example a siliconized protective layer.

The two embodiments described above make it possible to roll up the self-adhesive article then unroll it without problems of transfer of adhesive between the adhesive layer and the permanent support.

According to an embodiment, the permanent support is coated on both faces with an adhesive composition, which can be identical or different, at least one of the two adhesive compositions being according to the invention.

Supports can be prepared from the following materials:
polyurethane materials Estane™ 58309 NAT022 (B.F. Goodrich, Cleveland, Ohio),
polyurethane Rucothane™ or polyester elastomer HytreFM 4056 (DuPont, Wilmington, Del.),
polyether block amide Pebax™ 2533 or 3533 (Arkema, Paris, France).

The self-adhesive article obtained from the adhesive composition according to the invention can be manufactured according to a process as described previously for the self-adhesive article according to the invention.

The self-adhesive article can be used in a bonding process comprising the following steps:
a) removing the release liner, when such a film is present;
b) applying the article onto a surface; and
c) applying pressure on said article.

According to an embodiment in which the self-adhesive article is a double-sided article, the bonding process also comprises a step of applying the article bonded onto the first surface onto a second surface.

EXAMPLES

Different adhesive compositions were tested on two different types of support layer: a PET support and a support made from foam according to the invention.

The following polymers were used:
GENIOSIL® STP-10 (available from Wacker): polyether of formula (II) with two terminal groups of dimethoxysilane type, an average molar mass of 8889 g/mol, a polydispersity of approximately 1.6 and a quantity of silyl functions of 0.225 milliequivalent per gram of polymer;

GENIOSIL® STP-15 (available from Wacker): polyether of formula (I) with two terminal groups of trimethoxysilane type, an average molar mass of 10000 g/mol, a polydispersity of approximately 1.6 and a quantity of silyl functions of 0.200 milliequivalent per gram of polymer;

GENIOSIL® STP-30 (available from Wacker): polyether of formula (II) with two terminal groups of dimethoxysilane type, an average molar mass of 14493 g/mol, a polydispersity of approximately 1.6 and a quantity of silyl functions of 0.138 milliequivalent per gram of polymer;

Polyurethane A as described in international application WO 2009/106699: polyurethane of formula (I) with two terminal groups of trimethoxysilane type, an average molar mass of 16393 g/mol, a polydispersity of approximately 1.7 and a quantity of silyl functions of 0.122 milliequivalent per gram of polymer;

SPUR+® 1050MM (available from Momentive): polyurethane of formula (I) with two terminal groups of trimethoxysilane type, an average molar mass of 16393 g/mol, a polydispersity of approximately 1.7 and a quantity of silyl functions of 0.122 milliequivalent per gram of polymer;

DESMOSEAL® S XP 2636 (available from Bayer): polyether of formula (I) with two terminal groups of trimethoxysilane type, an average molar mass of 15038 g/mol, a quantity of silyl functions of 0.133 milliequivalent per gram of polymer;

MS Polymer® SAT 145 (available from Kaneka): with one terminal group of dimethoxysilane type, an average molar mass of approximately 3497 g/mol, and a polydispersity of approximately 2.1 included within the family of "other silylated polymers" and a quantity of silyl functions of 0.286 milliequivalent per gram of polymer;

polymer Ex16-17: polyether of formula (II) with 3 terminal groups of trimethoxysilane type, an average molar mass of 12658 g/mol and a quantity of silyl functions of 0.237 milliequivalent per gram of polymer.

The polymer Ex16-17 is prepared according to the following procedure:
Introducing 92.08 g of polyol ACCLAIM® 6300 (available from Bayer) into a glass synthesis apparatus, under a nitrogen atmosphere and under vacuum, heated to approximately 85-90° C.; then
Maintaining the apparatus for approximately 1 hour under vacuum at 85-90° C.; then
Introducing 2.56 g of isophorone diisocyanate;
Homogenizing for approximately 45 minutes at 85° C.; then
Introducing 0.1 g of catalyst BORCHI KAT® VP 0244 (bismuth/zinc neodecanoate available from Société Borchers); then
Maintaining at 85-90° C. under nitrogen for a minimum of 2 hours until the NCO functions totally disappear, then
Introducing 4.85 g of GENIOSIL® GF40 (3-isocyanatopropyltrimethoxysilane available from Wacker); then
Maintaining at 85-90° C. under nitrogen for approximately 2 hours and checking that the NCO functions totally disappear.

The following products were also used:
DERTOPHENE® H 150: tackifier resin of terpene phenolic type;
IRGANOX® 1010 and IRGANOX® 245: stabilizers;
K-KAT® 5218: cross-linking catalyst;
Vinylglycoxysilane: agent capable of absorbing water ("water scavenger").

Tables 1 and 1a show the components of the adhesive compositions which were tested. The quantities of each constituent are given in percentage by mass.

Adhesive compositions C1, C2, C3, C4, and C5 correspond to comparative adhesive compositions.

Compositions 1 to 5, 7, 9 to 11, 14, 16 and 17 correspond to adhesive compositions according to the invention.

TABLE 1 adhesive compositions (% by mass)

|  | C1 | C2 | C3 | C4 | C5 | 1 | 2 | 3 | 4 |
|---|---|---|---|---|---|---|---|---|---|
| GENIOSIL ® STPE10 |  |  |  |  |  |  | 51.70 | 25.80 | 38.90 |
| GENIOSIL ® STPE15 |  |  | 51.10 |  | 38.90 |  |  | 25.80 | 12.90 |
| GENIOSIL ® STPE30 |  |  |  | 12.90 | 51.70 |  |  |  |  |
| Polyurethane A of WO2009/106699 | 51.70 |  |  | 41.00 |  |  |  |  |  |
| SPUR+ ® 1050MM |  | 51.70 |  |  |  |  |  |  |  |
| MS Polymer ® SAT 145 |  |  |  | 10.10 |  |  |  |  |  |
| DERTOPHENE ® H150 | 46.70 | 46.70 | 46.18 | 46.20 | 46.70 | 46.70 | 46.70 | 46.70 | 46.75 |
| IRGANOX ® 1010 | 0.47 | 0.47 | 0.47 | 0.45 | 0.45 | 0.47 | 0.47 | 0.47 | 0.46 |
| IRGANOX ® 245 | 0.25 | 0.25 | 0.25 | 0.25 | 0.25 | 0.25 | 0.25 | 0.24 | 0.24 |
| K-KAT ® 5218 | 0.50 | 0.50 | 2.00 | 2.00 | 1.00 | 0.50 | 0.50 | 1.00 | 0.75 |
| Vinylglycoxysilane | 0.38 | 0.38 |  |  |  | 0.38 | 0.38 |  |  |

TABLE 1a adhesive compositions (% by mass)

|  | 5 | 7 | 9 | 10 | 11 | 14 | 16 | 17 |
|---|---|---|---|---|---|---|---|---|
| GENIOSIL ® STPE10 | 25.80 | 25.80 |  |  |  |  |  |  |
| GENIOSIL ® STPE15 |  |  |  | 25.80 |  |  |  |  |
| GENIOSIL ® STPE30 |  |  | 25.80 | 25.80 | 12.90 | 25.80 | 25.80 | 38.90 |
| Polyurethane A of WO2009/106699 |  | 25.80 | 25.80 |  |  |  |  |  |
| DESMOSEAL ® SXP2636 | 25.80 |  |  |  | 38.90 | 25.80 |  |  |
| Polymer Ex16-17 |  |  |  |  |  |  | 25.80 | 12.90 |
| DERTOPHENE ® H150 | 46.70 | 46.70 | 46.70 | 46.70 | 46.70 | 46.70 | 46.70 | 46.70 |
| IRGANOX ® 1010 | 0.45 | 0.45 | 0.45 | 0.45 | 0.45 | 0.45 | 0.45 | 0.47 |
| IRGANOX ® 245 | 0.25 | 0.25 | 0.25 | 0.25 | 0.25 | 0.25 | 0.25 | 0.25 |
| K-KAT ® 5218 | 1.00 | 1.00 | 1.00 | 1.00 | 1.00 | 1.00 | 1.00 | 0.50 |

TABLE 2

Percentage of dialkoxylated silyl functions with respect to the total quantity of silyl functions in the polymer or the mixture of polymers

| Adhesive compositions | D (%) |
|---|---|
| C1 | 0 |
| C2 | 0 |
| C3 | 0 |
| C4 | 36.6 |
| C5 | 18.6 |
| 1 | 100 |
| 2 | 100 |
| 3 | 52.9 |
| 4 | 77.2 |
| 5 | 62.8 |
| 7 | 64.8 |
| 9 | 53.1 |

TABLE 2-continued

Percentage of dialkoxylated silyl functions with respect to the total quantity of silyl functions in the polymer or the mixture of polymers

| Adhesive compositions | D (%) |
|---|---|
| 10 | 40.8 |
| 11 | 25.6 |
| 14 | 50.9 |
| 16 | 36.8 |
| 17 | 63.7 |

The properties of the self-adhesive article according to the invention (with a support layer in the form of a foam) were assessed and compared with the properties of a comparative self-adhesive article (with a support layer made from PET).

The support layer in the form of a foam which was used for the tests is a foam TL SRZ® 1200.8 available from Alveo with the following characteristics:
An elongation at break in length at 23° C. of 408.3±53%,
An elongation at break in width at 23° C. of 390.3%,
A bulk density of approximately 96.92 kg/m$^3$,
A thickness of approximately 0.67 mm,
A Young's modulus of 11.2±0.5 MPa.

The support layer made from PET which was used for the tests has a thickness of 50 μm.

The compositions shown in Table 1 and 1a were applied onto the two support layers described above with a weight per unit area of approximately 50 g/m$^2$ in order to obtain a self-adhesive article.

Process for obtaining the self-adhesive articles tested: Each adhesive composition is preheated to a temperature of approximately 100° C. and introduced into a cartridge, from which a bead is extruded then deposited close to the edge of the support layer, parallel to its width. The adhesive composition contained in this bead is then spread over the entire surface of a siliconized support (release liner), so as to obtain a uniform layer of substantially constant thickness, using an applicator ("coater") with a lipped nozzle which is moved from one side of the support layer to the opposite side. A layer of composition is thus deposited and corresponds to a weight per unit area of approximately 50 g/m$^2$ (thickness of approximately 50 μm). The support layer thus coated with the adhesive composition is then placed in an oven at a temperature of approximately 120° C. supplied with steam so that the quantity of water is approximately 50 g/m$^3$ with a homogeneous distribution. The residence time in the oven is approximately 5 minutes, allowing the adhesive composition to cross-link in order to obtain an adhesive layer. Finally, once removed from the oven, the cross-linked adhesive layer is then laminated on the desired support layer (foam Alveo® TLSRZ® 1200.8 or PET 50 μm support).

Static Shear Resistance Time of the Adhesive Joint at 90° C. or 70° C.:

Maintaining the tack of the support layer coated with the cross-linked composition at a high temperature is assessed at the latest in the 5 hours following its production by a test which determines the static shear resistance time of the adhesive joint at 90° C. on PET and at 70° C. on foam. For this test, reference is made to the FINAT No. 8 method. The principle is the following.

A sample in the form of a rectangular strip (25 mm×75 mm) is cut from the PET support layer or the foam support layer coated with the previously-prepared cross-linked composition, a maximum of 5 hours after its preparation. After removing the release liner in its entirety, a square portion having 25 mm sides situated at the end of the adhesive strip is fixed onto a glass plate.

The test plate thus obtained is introduced, by means of a suitable support, in a substantially vertical position into an oven at 90° C. for the article made with PET and 70° C. for the article made with foam, the non glued portion that has a length of 50 mm being situated below the plate. After thermal balancing, the portion of the strip that remains free is connected to a 1 kg weight, the whole of the device still throughout the duration of the test being kept in the oven at 90° C. and 70° C. respectively for the PET support and the foam support.

Under the effect of this weight, the adhesive joint which provides the attachment of the strip onto the plate undergoes a shear stress. For better control of this stress, the test plate is in fact placed so as to form an angle of 2° to the vertical.

A note is made of the time at the end of which the strip becomes detached from the plate following the breaking of the adhesive joint under the effect of this stress.

This time is indicated in Tables 3 and 3a.

TABLE 3 properties of the self-adhesive articles

| | C1 | C2 | C3 | C4 | C5 | 1 | 2 | 3 | 4 |
|---|---|---|---|---|---|---|---|---|---|
| Support layer made of PET | | | | | | | | | |
| Shear resistance at 90° C. | >24 h | >24 h | >24 h | >24 h | >24 h | >24 h | >24 h | >24 h | >24 h |
| Support layer in the form of an Alveo TL SRZ ® 1200.8 foam | | | | | | | | | |
| Shear resistance at 70° C. | 0.1 h | 0.2 h | 0.1 h | 1 h | 5 h | >24 h | >24 h | >24 h | >24 h |

TABLE 3a properties of the self-adhesive articles

| | 5 | 7 | 9 | 10 | 11 | 14 | 16 | 17 |
|---|---|---|---|---|---|---|---|---|
| Support layer made of PET | | | | | | | | |
| Shear resistance at 90° C. | >24 h | >24 h | >24 h | >24 h | >24 h | >24 h | >24 h | >24 h |
| Support layer in the form of an Alveo TL SRZ ® 1200.8 foam | | | | | | | | |
| Shear resistance at 70° C. | >24 h | >24 h | >24 h | >24 h | >24 h | >24 h | >24 h | >24 h |

Comparative examples C1, C2, C3, C4 and C5 show that self-adhesive articles comprising an identical adhesive composition have properties that differ depending on the support layer used. In fact, these examples give good results with respect to the shear resistance with a PET support (resistance greater than 24 h), but these comparative examples do not give satisfactory shear resistance results with a support in the form of a foam (resistance comprising 0.1 h, 0.2 h, 1 h or 5 h).

These tests show that none of the adhesive compositions of the prior which have satisfactory properties on PET supports have satisfactory properties on conformable supports of foam type, such as claimed.

Comparative example C5 illustrates an adhesive composition in which the percentage of dialkoxylated silyl functions with respect to the total quantity of silyl functions is less than 20% by weight. The shear resistance obtained with this adhesive composition on a PET layer is greater than 24 h whereas it is only 5 h on a support layer in the form of a foam.

In contrast, Examples 1 and 2 according to the invention, in which the adhesive composition comprises a single polymer corresponding to formula (II), give good results with a support in the form of a foam.

Examples 3 to 5, 7, 9 to 11, 14, 16 and 17, in which the adhesive composition has a percentage of dialkoxylated silyl functions with respect to the total quantity of silyl functions greater than or equal to 20% by weight and where the adhesive composition comprises the mixture of two different polymers including at least one polymer of formula (II) give satisfactory results in terms of shear resistance.

Of course the present invention is not limited to the examples and embodiment described and shown, but is capable of numerous variants accessible to a person skilled in the art.

The invention claimed is:

1. A self-adhesive article comprising a support layer coated with an adhesive layer, said support layer having an elongation at break ranging from 50 to 1200% and a bulk density ranging from 25 to 1200 kg/m³, said adhesive layer being obtained by cross-linking an adhesive composition comprising:
   a) a mixture of at least two polymers having at least 20% of dialkoxylated silyl functions, with respect to the total quantity of silyl functions in the mixture of polymers, and comprising:
      at least 20% by weight, with respect to the total weight of the mixture of polymers, of at least one polyurethane or at least one polyether comprising two or three hydrolysable dialkoxysilane terminal groups and corresponding to formula (II):

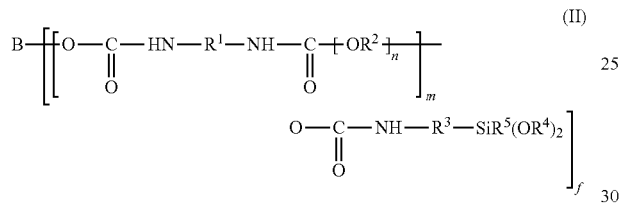

and
      at least one polymer corresponding to one of formulae (I), (III) or (IV) wherein:
         when a polymer of formula (I) is present, the mixture of polymers comprises up to 80% by weight, with respect to the total weight of the mixture of polymers, of at least one polyurethane or at least one polyether comprising two or three hydrolyzable terminal groups of trialkoxysilane type and corresponding to formula (I):

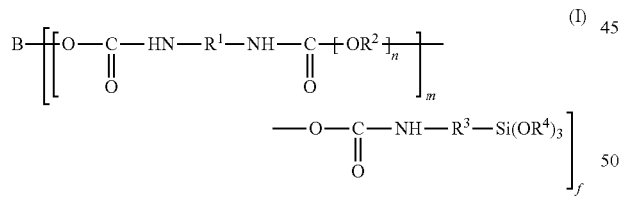

when a polymer of formula (III) is present, the mixture of polymers comprises up to 15% by weight, with respect to the total weight of the mixture of polymers, of at least one polyurethane or at least one polyether comprising two or three hydrolyzable terminal groups of monoalkoxysilane type and corresponding to formula (III):

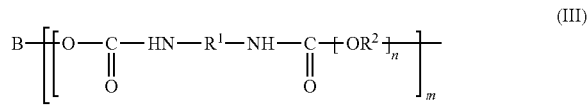

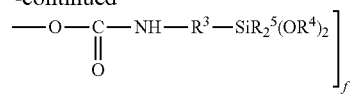

when a polymer of formula (IV) is present, the mixture of polymers comprises up to 15% by weight, with respect to the total weight of the mixture of polymers, of at least one polyurethane or at least one polyether comprising one hydrolyzable terminal group of the mono-, di- and-or trialkoxysilane type and corresponding to formula (IV):

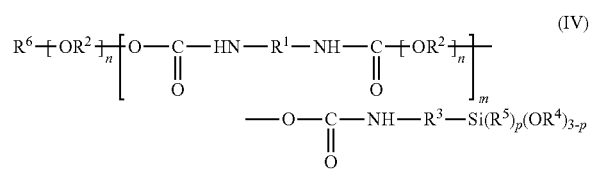

in formulae (I), (II), (III), and (IV) above:
   B represents one of the two formulae:

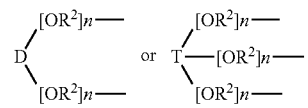

where D and T represent a hydrocarbon radical comprising 2 to 66 carbon atoms, linear, branched, cyclic, alicyclic or aromatic, saturated or unsaturated, optionally comprising one or more heteroatoms,
   $R^1$ represents a divalent hydrocarbon radical comprising 5 to 15 carbon atoms which can be aromatic or aliphatic, linear, branched or cyclic,
   $R^3$ represents a linear or branched divalent alkylene radical comprising 1 to 6 carbon atoms,
   $R^2$ represents a linear or branched divalent alkylene radical comprising 2 to 4 carbon atoms,
   $R^4$ and $R^5$, identical or different, each represent a linear or branched alkyl radical comprising 1 to 4 carbon atoms, $R^4$ optionally being part of a ring,
   $R^6$ represents a hydrocarbon-containing radical comprising 1 to 22 carbon atoms, linear, branched, cyclic, alicyclic or aromatic, saturated or unsaturated, optionally comprising one or more heteroatoms,
   n is an integer such that the average molar mass of the polyether block of formula $—[OR^2]_n—$ ranges from 300 g/mol to 40000 g/mol,
   m is an integer such that the average molar mass of the polymer ranges from 600 g/mol to 100000 g/mol,
   p is an integer equal to 0, 1 or 2,
   f is an integer equal to 2 or 3;
   b) at least one tackifier resin, and
   c) at least one cross-linking catalyst.

2. The self-adhesive article according to claim 1, wherein the support layer has a Young's modulus of less than or equal to 300 MPa.

3. The self-adhesive article according to claim 1, wherein the support layer is in the form of a foam.

4. The self-adhesive article according to claim 1, wherein the adhesive composition comprises:
from 20 to 85% by weight, with respect to the total weight of the adhesive composition, of a mixture of polymers,
from 15 to 80% by weight, with respect to the total weight of the adhesive composition, of at least one tackifier resin,
from 0.01 to 3% by weight, with respect to the total weight of the adhesive composition, of at least one cross-linking catalyst.

5. The self-adhesive article according to claim 1, wherein the tackifier resin has a number-average molar mass ranging from 100 Da to 5 kDa and is chosen from:
(i) resins able to be obtained by polymerization of terpene hydrocarbons and phenols, in the presence of Friedel-Crafts catalysts,
(ii) resins able to be obtained by polymerization of alpha-methyl styrene,
(iii) rosins of natural or modified origin;
(iv) resins obtained by hydrogenation, polymerization or copolymerization of mixtures of unsaturated aliphatic hydrocarbons having approximately 5, 9 or 10 carbon atoms, originating from petroleum cuts,
(v) terpene resins generally resulting from the polymerisation of terpene hydrocarbons in the presence of Friedel-Crafts catalysts,
(vi) copolymers based on natural terpenes, and
(vii) acrylic resins.

6. A mixture of at least two polymers suitable for use in an adhesive composition, said mixture comprising at least 20% of dialkoxylated silyl functions with respect to the total quantity of silyl functions in the mixture of at least two polymers and comprising:
at least 20% by weight, with respect to the total weight of the mixture, of at least one polymer comprising two or three hydrolyzable terminal groups of dialkoxysilane type and corresponding to formula (II):

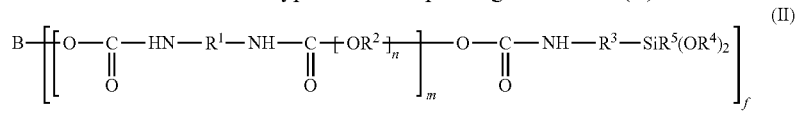
(II)

and
at least one polymer corresponding to one of formulae (I), (III) or (IV) wherein:
when a polymer of formula (I) is present, the mixture comprises up to 80% by weight, with respect to the total weight of the mixture, of at least one polyurethane or at least one polyether comprising two or three hydrolyzable terminal groups of trialkoxysilane type and corresponding to formula (I):

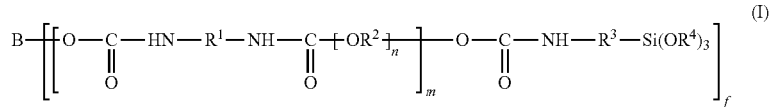
(I)

when a polymer of formula (III) is present, the mixture comprises up to 15% by weight, with respect to the total weight of the mixture, of at least one polyurethane or at least one polyether comprising two or three hydrolyzable terminal groups of monoalkoxysilane type and corresponding to formula (III):

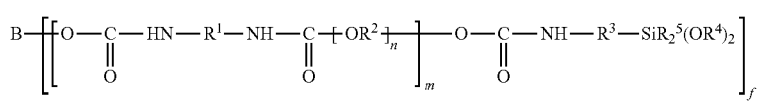
(III)

when a polymer of formula (IV) is present, the mixture comprises up to 15% by weight, with respect to the total weight of the mixture of polymers, of at least one polyurethane or at least one polyether comprising one hydrolyzable terminal group of the mono-, di- and-or trialkoxysilane type and corresponding to formula (IV):

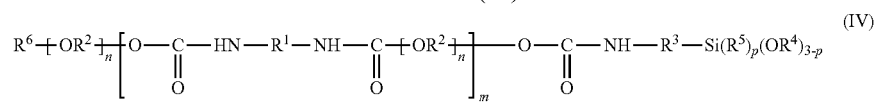
(IV)

in formulae (I), (II), (III), and (IV) above.

7. The mixture of at least two polymers according to claim 6, comprising:
- up to 95% by weight, with respect to the total weight of the mixture, of at least one polymer corresponding to formula (I), and
- at least one polymer corresponding to formula (II).

8. The mixture of at least two polymers according to claim 6, comprising:
- from 10 to 85% by weight of at least one polymer corresponding to formula (I), and
- from 15 to 90% by weight of at least one polymer corresponding to formula (II), with respect to the total weight of the mixture of at least two polymers.

9. The mixture of at least two polymers according to claim 6, comprising:
- up to 15% by weight, with respect to the total weight of the mixture, of at least one polymer corresponding to formula (III), and
- at least one polymer corresponding to formula (II).

10. An adhesive composition suitable for use for the manufacture of a self-adhesive article, comprising:
- the mixture of at least two polymers according to claim 6,
- at least one tackifier resin, and
- at least one cross-linking catalyst.

11. The adhesive composition according to claim 10, comprising.
- from 20 to 85% by weight, with respect to the total weight of the adhesive composition, of said mixture of at least two polymers,
- from 15 to 80% by weight, with respect to the total weight of the adhesive composition, of at least one tackifier resin,
- from 0.01 to 3% by weight, with respect to the total weight of the adhesive composition, of at least one cross-linking catalyst.

* * * * *